United States Patent
Chevallier et al.

(10) Patent No.: US 12,014,582 B2
(45) Date of Patent: Jun. 18, 2024

(54) METHOD FOR PROTECTING AGAINST THE EFFECTS OF THE UNINTENTIONAL RESETTING OF A WHEEL UNIT

(71) Applicant: Continental Automotive Technologies GmbH, Hannover (DE)

(72) Inventors: Vincent Chevallier, Toulouse (FR); Fabien Deleplanque, Toulouse (FR); Xavier Rolland, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/276,959

(22) PCT Filed: Mar. 11, 2022

(86) PCT No.: PCT/EP2022/056295
§ 371 (c)(1),
(2) Date: Aug. 11, 2023

(87) PCT Pub. No.: WO2022/189610
PCT Pub. Date: Sep. 15, 2022

(65) Prior Publication Data
US 2024/0096138 A1    Mar. 21, 2024

(30) Foreign Application Priority Data
Mar. 12, 2021 (FR) ........................ 2102436

(51) Int. Cl.
*G07C 5/00* (2006.01)
(52) U.S. Cl.
CPC .................... *G07C 5/006* (2013.01)

(58) Field of Classification Search
None
See application file for complete search history.

(56) References Cited

U.S. PATENT DOCUMENTS

| | | |
|---|---|---|
| 4,751,670 A | 6/1988 | Hess |
| 6,545,599 B2 | 4/2003 | Derbyshire et al. |

(Continued)

FOREIGN PATENT DOCUMENTS

| | | |
|---|---|---|
| EP | 1626341 A1 | 2/2006 |
| FR | 3055247 A1 | 3/2018 |
| FR | 3077232 A1 | 8/2019 |

OTHER PUBLICATIONS

English Translation of the Written Opinion for International Application No. PCT/EP2022/056295, dated Jul. 6, 2022, 7 pages.

(Continued)

*Primary Examiner* — Abdhesh K Jha
(74) *Attorney, Agent, or Firm* — BUCHANAN INGERSOLL & ROONEY PC

(57) ABSTRACT

A method for preventing the unintentional resetting of a wheel unit suitable for being mounted on a wheel of a motor vehicle, which wheel unit operates according to a plurality of distinct operating modes and includes a non-volatile memory, at least one update step that aims to update and store in the memory at least one variable for identifying the operating mode to be applied in the event of a reset, and a restoration step that is performed in the event of a reset of the wheel unit and forces the wheel unit to transition to the operating mode associated with the at least one identification variable stored during the preceding update step.

8 Claims, 2 Drawing Sheets

(56) References Cited

U.S. PATENT DOCUMENTS

| | | |
|---|---|---|
| 7,331,222 B2 | 2/2008 | Watabe |
| 7,340,326 B2 * | 3/2008 | Abe .................... G06F 11/1441 701/1 |
| 11,440,359 B2 | 9/2022 | Guinart et al. |
| 11,465,455 B2 | 10/2022 | Létard |

OTHER PUBLICATIONS

International Search Report and Written Opinion for International Application No. PCT/EP2022/056295, dated Jul. 6, 2022, 9 pages.
International Search Report and Written Opinion for International Application No. PCT/EP2022/056295, dated Jul. 6, 2022, 13 pages (French).
French Search Report for French Application No. 2102436, dated Nov. 25, 2021 with translation, 14 pages.

* cited by examiner

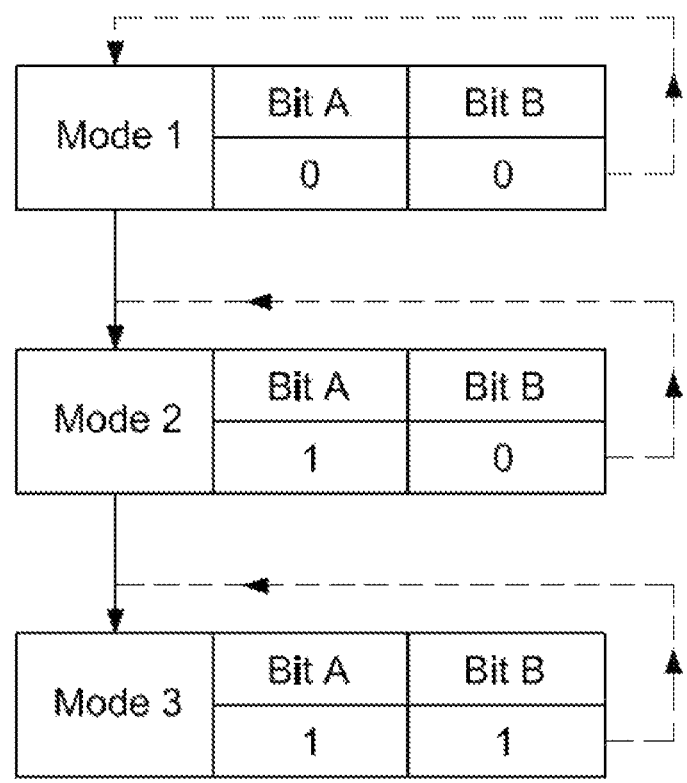

METHOD FOR PROTECTING AGAINST THE EFFECTS OF THE UNINTENTIONAL RESETTING OF A WHEEL UNIT

CROSS REFERENCE TO RELATED APPLICATIONS

This application is the U.S. National Phase Application of PCT International Application No. PCT/EP2022/056295, filed Mar. 11, 2022, which claims priority to French Patent Application No. 2102436, filed Mar. 12, 2021, the contents of such applications being incorporated by reference herein.

FIELD OF THE INVENTION

The present patent application relates to a method for preventing the unintentional resetting of a wheel unit suitable for being mounted on a motor vehicle, which wheel unit operates according to a plurality of distinct operating modes and comprises a battery associated with a memory.

BACKGROUND OF THE INVENTION

For security purposes, it is known practice to provide a motor vehicle with a monitoring system known by the acronym "TPMS" (Tire Pressure Monitoring System).

Such a monitoring system generally comprises a central processing unit and electronic devices called "wheel units".

Each wheel unit is fitted to an associated wheel of the vehicle and a radiofrequency communication assembly ensures communication between each wheel unit and the central processing unit.

Each wheel unit comprises sensors in order in particular to detect an anomaly with the wheel. These sensors can for example be a tire inflation pressure sensor, a temperature sensor, or a wheel acceleration sensor.

In addition, each wheel unit comprises a battery and an associated memory.

The wheel unit adopts different operating modes depending on the use thereof, such as for example a manufacturing mode, which is adopted during a phase of manufacturing of the wheel unit in a plant, a delivery mode, which is adopted during a delivery phase of the wheel unit, and a stationary mode, which is adopted when the wheel unit is mounted on a wheel of the vehicle when it is stationary.

Other operating modes can be adopted by the wheel unit, in particular when the vehicle provided with the wheel unit is in motion.

The wheel unit can undergo resets, more particularly hardware resets referred to as "cold", or software resets referred to as "hot".

"Cold" resets are caused by a battery voltage below a certain threshold, for example 1.7 volts, or by a temporary interruption of the power supply to the wheel unit, for example in the event that the wheel unit has been subject to an electrostatic discharge.

"Hot" resets are caused in very specific cases, such as for example in the event of an infinite loop in the software implemented by the wheel unit.

These two types of reset have the common consequence of resetting the registers of the wheel unit, resetting the "RAM" volatile memory of the wheel unit, and resetting the software implemented by the wheel unit.

A problem consistently found with the method for implementing a wheel unit of the type described above is that the wheel unit returns to a default mode when it is reset.

When the wheel unit is reset, the volatile memory is erased and the wheel unit is restored to a default mode, generally its stationary mode. The mode in which the reset occurred is not taken into account.

This strategy poses problems, as a reset of the wheel unit that occurs during a passage in a mode other than the default mode, here stationary mode, generates a transition to this stationary mode, which is probably inappropriate for the operating context of the wheel unit.

Cold resets mainly occur during the electromagnetic compatibility tests, and in particular during the electrostatic discharge tests, during which the wheel unit normally adopts a manufacturing mode, as this is the most appropriate mode for performing a diagnosis during the electromagnetic compatibility tests.

This behavior of the wheel unit can result in failures during the design validation of the wheel unit, as the behavior of the wheel unit is modified due to an inappropriate operating mode being adopted.

Such behavior also makes the test results complex to analyze, as it is difficult to identify whether the change in operating mode is due to a reset or another cause.

This transition to a default mode in the event that the wheel unit is reset also affects other use cases such as for example the manufacturing of the wheel unit, the storage of the wheel unit by the manufacturer or a third party, the assembly of the wheels, and finally the analysis of the wheel unit in the event of failure.

SUMMARY OF THE INVENTION

An aspect of the present invention aims in particular to overcome these drawbacks by proposing a method for implementing the wheel unit that makes it possible to prevent, or limit, the disruption and modifications caused by a reset of the wheel unit.

Another aim of an aspect of the invention is to promote the analysis of a cold reset on a wheel unit for purposes of diagnosing the wheel unit.

These aims, together with others that will become apparent on reading the following description, are achieved by means of a method for preventing the unintentional resetting of a wheel unit suitable for being mounted on a wheel of motor vehicle, which wheel unit operates according to a plurality of distinct operating modes and comprises a battery associated with at least one non-volatile memory and at least one sensor powered by said battery, characterized in that it comprises at least:

an update step that aims to update and store in said memory at least one variable for identifying the operating mode to be applied in the event of a reset of the wheel unit performed automatically by analysis of the data supplied by the at least one sensor, and a restoration step that is performed in the event of a reset of the wheel unit and forces the wheel unit to transition to the operating mode associated with the at least one identification variable stored during the preceding update step.

In the event of an unintentional reset, this feature allows the wheel unit to adopt an operating mode appropriate to the situation and not a default operating mode.

According to other optional features of the method according to an aspect of the invention, taken individually or in combination:

the method comprises a counting step that consists of counting and writing to said memory the number of resets undergone by the wheel unit. This feature promotes the analysis and diagnosis of the wheel unit in the event of a malfunction;

during the update step of the method applied to a wheel unit that operates according to at least three distinct operating modes, a first identification variable is set to a false or true state and a second identification variable is set to a false or true state, depending on the current operating mode adopted by the wheel unit, the combination of the states of the two identification variables making it possible to store at least three distinct combinations that are each associated with one of said operating modes. This feature makes it possible to store the operating mode to be applied in the event of a rest with a restricted memory, by means of just two indicator bits;

the three operating modes of the wheel unit comprise at least a first manufacturing mode corresponding to a production phase of the wheel unit, at least a second delivery mode corresponding to a delivery phase of the wheel unit, and at least a third stationary mode corresponding to an operational phase of the wheel unit;

the energy from the battery consumed by the wheel unit varies depending on the operating mode adopted by the wheel unit;

said reset of the wheel unit can be generated by an external electromagnetic field;

during the update step, the at least one identification variable is stored in the memory if the ambient temperature measured by a sensor is within a predetermined operating range of the memory. This feature makes it possible to avoid the risk of a fault in writing to the memory in unsuitable temperature conditions.

An aspect of the present invention also relates to a motor vehicle comprising at least one wheel unit that implements a method as described above.

BRIEF DESCRIPTION OF THE DRAWINGS

Further features and advantages of aspects of the invention will become apparent on reading the following description, with reference to the appended figures, which illustrate:

FIG. 3: a flowchart that illustrates the behavior of the wheel unit implementing the method according to an aspect of the invention.

For greater clarity, identical or similar elements are denoted by identical or similar reference signs throughout the figures.

DETAILED DESCRIPTION OF THE PREFERRED EMBODIMENTS

Figure 1:
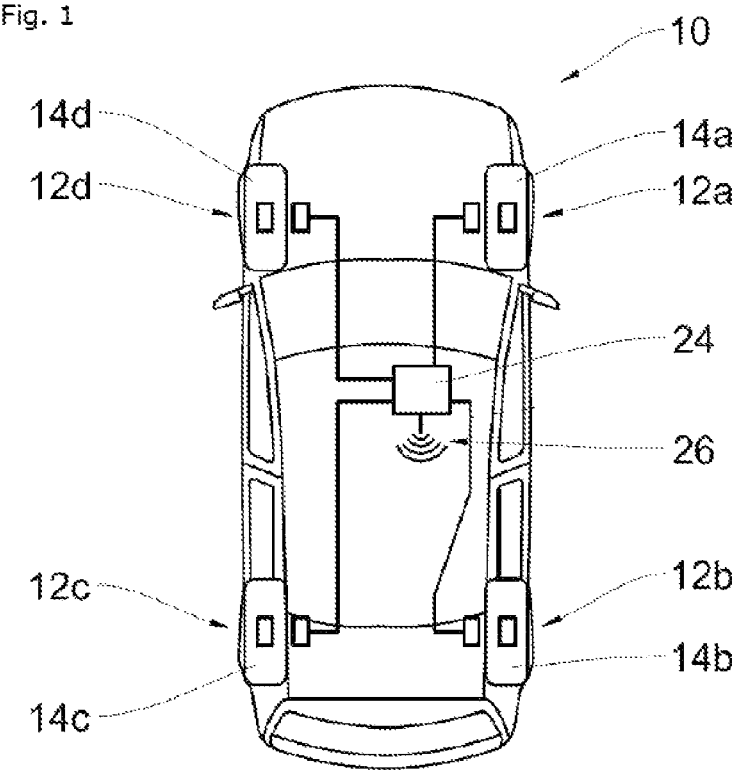
FIG. 1: a schematic top view of a motor vehicle provided with a wheel unit implementing the method according to an aspect of the invention.

FIG. 1 shows a motor vehicle 10 provided with a "TPMS" (Tire Pressure Monitoring System) monitoring system.

More particularly, the motor vehicle 10 is provided with four wheel units 12a, 12b, 12c, 12d that are each mounted on an associated wheel 14a, 14b, 14c, 14d of the motor vehicle 10.

For the sake of clarity, only one wheel unit, referenced 12a, is described in the remainder of the description.

Figure 2:
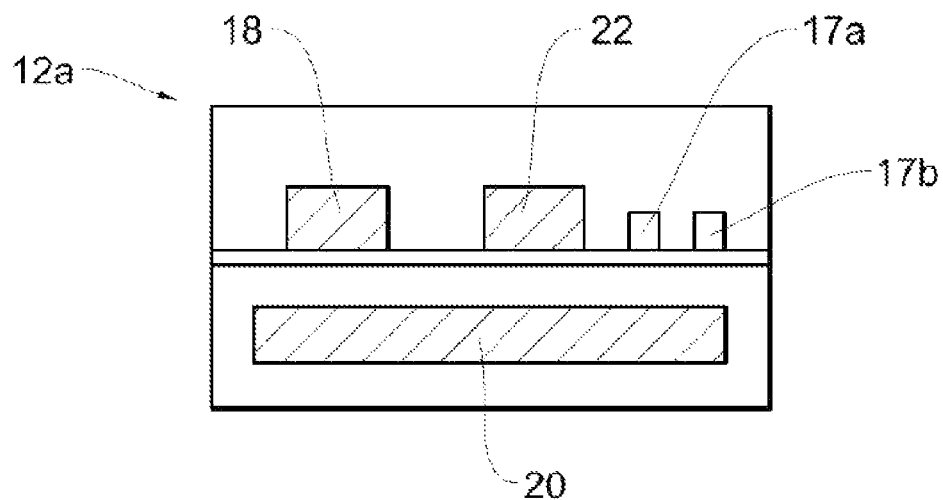
FIG. 2: a schematic cross-sectional view that illustrates the wheel unit in FIG. 1.

The wheel unit 12a comprises an electronics housing that contains a set of sensors, such as a temperature sensor 17a and a pressure sensor 17b for the tire of the associated wheel 14a, as can be seen in FIG. 2.

The wheel unit 12a also comprises a processor 18, a battery 20 and a non-volatile memory 22.

The memory 22 has the capacity to store a plurality of binary elements commonly known as "bits".

Preferably, the memory 22 is a flash memory, so that the elements stored in the memory 22 are not lost if the power is cut off during a reset.

The wheel unit 12a communicates with a central unit 24, which is mounted on the motor vehicle 10, via a radiofrequency communication system 26.

The wheel unit 12a operates according to a plurality of distinct operating modes during its life, each operating mode meeting a need depending on the instantaneous use of the wheel unit 12a.

According to one exemplary embodiment illustrated in FIG. 3, the wheel unit 12a operates according to three operating modes, namely a so-called manufacturing mode 1 that starts on the initialization of the wheel unit 12a after the associated battery 20 has been soldered, a so-called delivery mode 2 and a so-called stationary mode 3.

The delivery mode 2 is adopted by the wheel unit 12a when it leaves the manufacturing plant with a view to delivery to a third party.

The stationary mode 3 is adopted by the wheel unit 12a when the wheel unit 12a is mounted on the associated wheel and the associated motor vehicle 10 is stationary.

An aspect of the invention more particularly relates to a method for preventing the unintentional resetting of the wheel unit 12a.

Reset is given to mean equally a hardware reset referred to as "cold" or a software reset referred to as "hot".

Hot resets are caused in very specific cases, in particular in the event of the failure of the software implemented by the wheel unit 12a, such as for example in the event of an infinite loop in the software.

Cold resets are caused for example by a temporary interruption of the power supply to the wheel unit 12a, in particular due to an external electromagnetic field that can be characterized by an electrostatic discharge.

Such a reset due to an external electromagnetic field can occur in particular in the event of an electromagnetic compatibility test or a radiated immunity test.

The electromagnetic compatibility test on the wheel unit 12a is generally performed in a laboratory, when the wheel unit 12a is in the manufacturing mode 1.

Likewise, the wheel unit 12a can also undergo an electrostatic discharge during its end use on the associated wheel 14a of the motor vehicle 10, which corresponds to the stationary mode 3.

By way of non-limiting example, cold resets can also be caused by an unintentional disconnection of the battery, by a thermal protection device, a battery undervoltage, a failure of the memory 22, or by a software reset.

According to an aspect of the invention, the method comprises an update step that aims to update and store in the memory 22 of the wheel unit 12a two variables for identifying the operating mode to be applied in the event of a reset of the wheel unit 12a.

The two identification variables are formed by a first indicator bit A and a second indicator bit B, which can each adopt a false or true state.

By way of non-limiting example, the two identification variables can be replaced by a software variable that is able to adopt three distinct states that each correspond to one of the three operating modes of the wheel unit 12a.

With reference to FIG. 3, the false or true states of the first indicator bit A and of the second indicator bit B correspond to a "0" or "1" state respectively.

The combination of the states of the two indicator bits A, B makes it possible to store at least three distinct combinations that are each associated with one of the operating modes described above.

In addition, the method comprises a restoration step that is performed in the event of a reset of the wheel unit 12a and forces the wheel unit 12a to transition to the operating mode associated with the indicator bits A, B stored during the preceding update step.

The update step is performed by the wheel unit 12a at different stages of the life of the wheel unit 12a.

More particularly, the first update step is performed a first time during an initialization of the wheel unit 12a, following the connection by soldering between the battery 20 and the processor 18.

This first phase corresponds to the manufacturing mode 1 and the indicator bits A, B are each stored at 0, or false, as can be seen in FIG. 3.

In the event of a reset that occurs while the wheel unit 12a is in the manufacturing mode 1, the restoration step is performed and the wheel unit 12a is restored in the manufacturing mode 1 associated with the indicator bits A, B, as illustrated by the dashed arrows in FIG. 3.

Following the manufacturing of the wheel unit 12a, the wheel unit 12a switches to delivery mode 2.

Simultaneously, the first update step is performed again and the indicator bits A, B are stored at 1 and 0 respectively.

In the event of a reset that occurs while the wheel unit 12a is in the delivery mode 2, the restoration step is performed and the wheel unit 12a is restored in the delivery mode 2 associated with the indicator bits A, B, as illustrated by the dashed arrows in FIG. 3.

When the wheel unit 12a switches from the delivery mode 2 to the stationary mode 3, the first update step is performed again and the indicator bits A, B are each stored at 1, or true.

In the event of a reset that occurs while the wheel unit 12a is in the stationary mode 3, the restoration step is performed and the wheel unit 12a is restored in the stationary mode 3 associated with the indicator bits A, B, as illustrated by the dashed arrows in FIG. 3.

It will be noted that the indicator bits A, B, after they have been stored at 1, remain in this state throughout the remaining life of the wheel unit 12a, unless it is rebooted.

A reboot remains possible in order to allow an operator, for example during a test on the wheel unit 12a, to store the indicator bits A, B at 0 by transmitting an appropriate frame to the wheel unit by radiofrequency. This feature prevents the updating of the software implemented by the wheel unit in the development phase.

The reboot can be performed provided that at least one of the indicator bits A, B is not at 0, in order to limit unnecessary rewriting when the indicator bits A, B are already at 0.

The switch from one operating mode to another operating mode of the wheel unit 12a, which corresponds to the performance of the update step of the method, is carried out by an operator who acts on the software implemented by the wheel unit 12a.

However, by way of non-limiting example, the switch from one operating mode to another operating mode of the wheel unit 12a can be carried out automatically by analysis of the data supplied by a sensor, in particular by the pressure sensor 17b of the tire of the wheel 14a associated with the wheel unit 12a.

For example, when the pressure of the tire of the wheel 14a exceeds a pre-established set point value that means that the tire is inflated, the wheel unit 12a switches to the stationary mode 3.

According to another aspect of the invention, the method comprises a counting step that consists of counting, by means of a counter, and writing to the memory 22 of the wheel unit 12a the number of resets undergone by the wheel unit 12a, and more particularly the number of "cold" resets.

The resets are counted for example by means of a counter coded on four bits to store sixteen resets. The counter can be read during a diagnostic phase.

Advantageously, if a faulty wheel unit 12a is returned, counting the resets makes it possible to check whether or not the wheel unit 12a has undergone a reset.

By way of non-limiting example, the counting can also relate to "hot" resets by means of another counter.

For the sake of reliability, the data is stored in the memory 22 if the ambient temperature measured by the temperature sensor 17a provided to this end is within a predetermined operating range of the memory 22, for example a range of temperatures between minus twenty degrees Celsius and plus ninety degrees Celsius.

The ambient temperature is measured regularly, for example every ten minutes, the data being stored in the memory 22 when the ambient temperature measured is within the predetermined operating range of the memory 22.

An aspect of the present invention makes it possible to guarantee continued operation of the wheel unit 12a in case of events such as a "cold" or "hot" reset.

An aspect of the invention also makes it possible to reliably determine, a posteriori, whether an unintentional reset has occurred.

The method according to an aspect of the invention also makes it possible to simplify the test procedures and the analysis of the associated results, due to the reset counter and the observation of any resets.

In addition, an aspect of the invention makes it possible to configure the behavior of the wheel unit 12a adopted in the event of a reset according to the needs and desires of a third party, such as a client.

During the delivery phase of the wheel unit 12a, which here corresponds to the delivery mode 2, the wheel unit 12a is guaranteed to stay in this mode in the event of a reset. This feature is essential, as the delivery mode 2 is the least energy-intensive mode.

Finally, if the wheel unit 12a is returned to the plant, an aspect of the invention makes it possible to prevent an undesirable change of operating mode of the wheel unit 12a.

An aspect of the present invention does not mask serious defects of the wheel unit 12a, but only a transient behavior caused by changes in operating mode.

The invention claimed is:

1. A method for preventing the unintentional resetting of a wheel unit suitable for being mounted on a wheel of motor vehicle, which wheel unit operates according to a plurality of distinct operating modes and comprises a battery associated with at least one non-volatile memory and at least one sensor powered by said battery, the method comprising:

an update step that updates and stores in said memory at least one variable for identifying a current operating mode of the plurality of distinct operating modes to be applied in the event of a reset of the wheel unit performed automatically by analysis of the data supplied by the at least one sensor, and a restoration step that is performed in the event of a reset of the wheel unit and forces the wheel unit to transition to the identified operating mode associated with the at least one identification variable stored during the preceding update step.

2. The method as claimed in claim 1, further comprising a counting step that consists of counting and writing to said memory the number of resets undergone by the wheel unit.

3. The method as claimed in claim 1, applied to the wheel unit that operates according to at least three distinct operating modes, wherein during the update step, a first identification variable is set to a false or true state and a second identification variable is set to a false or true state, depending on the current operating mode adopted by the wheel unit, the combination of the states of the two identification variables making it possible to store at least three distinct combinations that are each associated with one of said operating modes.

4. The method as claimed in claim 3, wherein the three operating modes of the wheel unit comprise at least a first manufacturing mode corresponding to a production phase of the wheel unit, at least a second delivery mode corresponding to a delivery phase of the wheel unit, and at least a third stationary mode corresponding to an operational phase of the wheel unit.

5. The method as claimed in claim 1, wherein energy from the battery consumed by the wheel unit varies depending on the operating mode adopted by the wheel unit.

6. The method as claimed in claim 1, wherein said reset of the wheel unit is generated by an external electromagnetic field.

7. The method as claimed in claim 1, wherein during the update step, the at least one identification variable is stored in the memory if an ambient temperature measured by a temperature sensor is within a predetermined operating range of the memory.

8. A motor vehicle comprising at least one wheel unit that implements a method as claimed in claim 1.

* * * * *